(12) United States Patent
Roth et al.

(10) Patent No.: US 11,988,544 B2
(45) Date of Patent: May 21, 2024

(54) INCREASING THE WEIGHING ACCURACY WHEN WEIGHING NESTED PHARMACEUTICAL CONTAINERS

(71) Applicants: Syntegon Technology GmbH, Waiblingen (DE); Syntegon Packaging Systems AG, Beringen (CH); Syntegon Packaging Technology GmbH, Remshalden (DE)

(72) Inventors: Philipp Roth, Fichtenau (DE); Ulrich Krauß, Ilshofen (DE); Klaus Ullherr, Crailsheim (DE); Tim Fleckenstein, Vellberg (DE); Rolf Barthelmess, Crailsheim (DE); Martin Maerz, Weipertshofen (DE); Thomas Beck, Kressberg (DE); Ralf Riebeling, Crailsheim (DE); Heiko Wild, Ellwangen (DE); Joachim Radtke, Stuttgart (DE); Jochen Peters, Crailsheim (DE); Oliver Gerundt, Friolzheim (DE); Harald Ott, Freiberg am Neckar (DE); Olaf Eistert, Birenbach (DE); Frank Scholl, Thayngen (CH); Herbert Schaffert, Thalheim (DE); Jochen Lautenschlager, Korb (DE); Paul Mehringer, Stuttgart (DE); Faruk Civelek, Weinstadt (DE)

(73) Assignees: Syntegon Technology GmbH, Waiblingen (DE); Syntegon Packaging Systems AG, Beringen (CH); Syntegon Packaging Technology GmbH, Remshalden (DE)

( * ) Notice: Subject to any disclaimer, the term of this patent is extended or adjusted under 35 U.S.C. 154(b) by 502 days.

(21) Appl. No.: 17/293,343

(22) PCT Filed: Sep. 18, 2019

(86) PCT No.: PCT/EP2019/075092
§ 371 (c)(1),
(2) Date: May 12, 2021

(87) PCT Pub. No.: WO2020/099000
PCT Pub. Date: May 22, 2020

(65) Prior Publication Data
US 2022/0011151 A1 Jan. 13, 2022

(30) Foreign Application Priority Data

Nov. 14, 2018 (DE) .................. 10 2018 219 402.5

(51) Int. Cl.
*G01G 17/04* (2006.01)
*G01G 15/00* (2006.01)

(52) U.S. Cl.
CPC ........... *G01G 17/04* (2013.01); *G01G 15/006* (2013.01)

(58) Field of Classification Search
CPC ...... G01G 17/04; G01G 15/006; G01G 17/00; G01G 23/00; G01G 15/00; B65B 3/006; B65B 57/10
(Continued)

(56) References Cited

U.S. PATENT DOCUMENTS 3,053,332 A * 9/1962 Buchtenkirch ........... B65B 1/32
177/184
3,997,013 A * 12/1976 Brook ....................... B07C 5/18
177/52
(Continued)

FOREIGN PATENT DOCUMENTS

CN 202508290 U 10/2012
CN 103674767 A 3/2014
(Continued)

OTHER PUBLICATIONS

Chinese Patent Office Action for Application No. 20198007449887 dated Aug. 31, 2023 (18 pages including English translation).
(Continued)

*Primary Examiner* — Jacques M Saint Surin
(74) *Attorney, Agent, or Firm* — Michael Best & Friedrich LLP (57) ABSTRACT

The invention relates to a method for weighing pharmaceutical containers (10) nested in a carrier (11), in which at least one of the nested containers (10) is weighed by means of a weighing device (1), wherein a relative movement between the at least one pharmaceutical container (10) and the carrier (11) is brought about in order to release the pharmaceutical containers (10) from the carrier (11) in order to increase the weighing accuracy.

19 Claims, 6 Drawing Sheets

(58) Field of Classification Search
USPC .............................................. 177/1
See application file for complete search history.

(56) References Cited

U.S. PATENT DOCUMENTS

| | | | | |
|---|---|---|---|---|
| 4,722,733 | A * | 2/1988 | Howson | A61J 1/2096 |
| | | | | 141/330 |
| 7,451,667 | B2 * | 11/2008 | Hamady | F03G 3/00 |
| | | | | 74/5.34 |
| 7,536,843 | B2 * | 5/2009 | Djurle | B65B 59/001 |
| | | | | 53/900 |
| 7,893,368 | B2 * | 2/2011 | Yamamoto | G01G 21/286 |
| | | | | 177/180 |
| 9,493,254 | B2 * | 11/2016 | Boira Bonhora | G01G 15/04 |
| 11,142,352 | B2 * | 10/2021 | Gandhi | G01G 15/00 |

FOREIGN PATENT DOCUMENTS

| | | |
|---|---|---|
| CN | 104635387 A | 5/2015 |
| CN | 107511197 A | 12/2017 |
| DE | 102004035061 A1 | 2/2006 |
| DE | 102016207600 A1 | 11/2017 |
| WO | 2014072019 A2 | 5/2014 |

OTHER PUBLICATIONS

Translation of International Search Report for Application No. PCT/EP2019/075092 dated Feb. 3, 2020 (2 pages).

* cited by examiner

INCREASING THE WEIGHING ACCURACY WHEN WEIGHING NESTED PHARMACEUTICAL CONTAINERS

BACKGROUND

The present invention relates to a method and device for weighing pharmaceutical containers nested in a carrier.

In the manufacture of pharmaceutical products in mass production, a plurality of appropriate pharmaceutical containers or vessels, for example syringes, ampoules, carpules, vials or the like, are often arranged in a plastics carrier plate, referred to as a nest. A nest of this kind is mostly used in a base plate for positioning the containers and for transporting them through a processing machine, as described in DE 10 2004 035 061 A1, for example. The containers can be, inter alia, filled, closed and removed individually in the processing machine. It is also necessary to check the capacity of the container, which is usually done by removing the container from the carrier and then weighing it. Alternatively, it is already known to weigh the containers in the carrier, with the containers being lifted from below by a weighing device.

SUMMARY

The method according to the invention for weighing pharmaceutical containers nested in a carrier is characterized in that the accuracy of the measurement results when weighing is increased in a simple manner. According to the invention, this is achieved by bringing about a relative movement between at least one pharmaceutical container, which is weighed by means of a weighing device, and the carrier. A relative movement between the carrier and the pharmaceutical container is possible in particular because the pharmaceutical container has a smaller diameter than a corresponding opening in the carrier in which the container is arranged, in particular hanging.

The pharmaceutical container is released from the carrier by the relative movement. That is to say, the pharmaceutical container is arranged in the carrier so as to be easily moveable in the released state. This prevents the container from tilting or getting stuck in the carrier during weighing. In addition, reduced friction between the released container and the carrier allows the container to be lifted particularly easily. Thus, if the pharmaceutical container nested in the carrier is placed on a weighing device, for example, or is lifted by a weighing device for weighing, distortion of the measurement results is reduced because the container is prevented from getting stuck in the carrier and the friction between the carrier and the container is reduced. In this way, potential influences which distort the measurement result are kept particularly low when the pharmaceutical container is weighed.

The deviations or disturbance variables are particularly advantageously measurable and reproducible in the method according to the invention and can thus be accordingly taken into account and excluded when evaluating the measured values.

A net weight of a product with which the pharmaceutical container is filled is preferably determined when the pharmaceutical container is weighed. For this purpose, the gross weight in particular of the filled pharmaceutical container is determined by means of the weighing device. The net weight can be determined from a difference between the gross weight and a tare weight, the weight of the empty pharmaceutical container. The tare weight can, for example, also be determined by means of the weighing device or externally by means of an additional weighing device before the pharmaceutical container is filled. The method according to the invention thus makes it possible to achieve particularly high accuracy when weighing the at least one pharmaceutical container.

The dependent claims contain preferred developments of the invention.

The relative movement is preferably brought about by an oscillation. The oscillation is particularly preferably a harmonic oscillation. An oscillation particularly favorably allows a relative movement between the carrier and the pharmaceutical container to be produced, so that the pharmaceutical container is in a stationary, released state relative to the carrier. It is particularly favorable for several superimposed oscillations to be introduced. Variables such as amplitude, frequency and phase shift of the individual or multiple oscillations can thus be adapted in a variety of ways in order to achieve an optimal result with regard to the release of the pharmaceutical containers. Amplitude, frequency and/or phase shift are preferably specifically adapted to the dimensions of the respective pharmaceutical containers.

It is particularly advantageous if the oscillation takes place in an x direction and/or in a y direction and/or in a z direction. Any combination of one-dimensional or multi-dimensional oscillations are possible. The x direction and the y direction are orthogonal to one another and span a plane which is horizontal in relation to a gravitational field and in which the carrier is located. The z direction is orthogonal to both the x direction and the y direction, and is therefore located in the vertical direction in relation to the gravitational field. Two superimposed harmonic oscillations are particularly preferably provided in the x direction and y direction in each case, in particular in the form of so-called Lissajous figures. This allows the pharmaceutical container to be released in a particularly simple and reliable manner.

The carrier and/or the weighing device preferably execute the oscillation in the form of a movement. This means that both the carrier and the weighing device can execute an oscillation in the form of a movement alone. In addition, the carrier and the weighing device can each execute one or more oscillations in the form of a movement at the same time. Either way, this leads to the carrier and pharmaceutical container moving relative to one another, in particular oscillating with respect to one another. Since the pharmaceutical container has a smaller diameter than the corresponding opening in the carrier in which the container is arranged, the container cannot follow the movement of the carrier directly and is regularly knocked or carried along by the vibrating carrier. As a result, a defined stationary state is established in which the container is held substantially in the center of the corresponding opening in the carrier. For this purpose, a frequency of the oscillation is preferably between 10 Hz and 25 Hz. If only the weighing device executes the oscillation in the form of a movement, the pharmaceutical container can only be released when the container and the weighing device make contact, i.e. during the weighing process. As a result of the oscillation in the form of a movement of the carrier and/or of the weighing device, the pharmaceutical container can be released from the carrier in a particularly simple and reliable manner. The pharmaceutical container is loosened from a possibly tilted arrangement or otherwise frictionally unfavorable positioning in the carrier by regular mechanical movement.

The movement of the carrier and/or of the weighing device is preferably brought about by at least one servomotor, which particularly preferably has an eccentric. Alternatively or additionally, at least one vibration motor can be provided, which brings about the movement of the carrier and/or of the weighing device. The servomotor and/or the vibration motor is correspondingly mechanically coupled to the carrier and/or the weighing device in order to effect the corresponding movement. A servomotor or a vibration motor is particularly favorable for setting the carrier and/or the weighing device into oscillation with a simple design.

Furthermore, it is particularly advantageous for the oscillation to be introduced in the form of sound. The sound is preferably generated by means of at least one loudspeaker apparatus. The at least one loudspeaker apparatus is advantageously integrated in the carrier and/or in the weighing device. Alternatively or additionally, at least one separate external loudspeaker apparatus can also be used. In either case, the sound is introduced in such a way that the pharmaceutical container moves relative to the carrier. For example, the sound can be adapted to the pharmaceutical container in such a way that resonance is induced. Introducing the oscillation in the form of sound is another particularly simple and inexpensive option for releasing the pharmaceutical container from the carrier.

More preferably, the relative movement between the pharmaceutical container and the carrier is brought about by an air flow on the pharmaceutical container. This is particularly preferably a pulsating air flow. The air flow is preferably generated by means of a fan apparatus. For example, an air flow can be introduced along a plane of the carrier so that the air flow strikes the pharmaceutical container perpendicularly and exerts a force thereon, whereby the pharmaceutical container is moved relative to the carrier and is thus released. Alternatively, a kind of air cushion can also be provided which at least briefly lifts the pharmaceutical container hanging in the carrier in order to release it.

It is also favorable for the relative movement between the pharmaceutical container and the carrier to be brought about by electrostatic effects on the pharmaceutical container. This can take place, for example, by an in particular non-stationary electrical field exerting a force on the pharmaceutical container such that said container is moved relative to the carrier. The electrostatic effects are advantageously brought about by a capacitor, in particular two capacitor plates between which the carrier is arranged.

The relative movement is particularly preferably brought about before weighing. This is particularly advantageous if the relative movement produced could have an effect on the weighing result, for example if the pharmaceutical container is briefly lifted by an air cushion in order to be released. Alternatively or additionally, the relative movement can also be brought about during the weighing process. If the weighing device and/or the carrier execute an oscillation in the form of a movement, for example, particularly precise results can be achieved when weighing the pharmaceutical container.

The at least one pharmaceutical container is preferably weighed by being lifted by means of the weighing device. This means that the weighing device is located vertically below the pharmaceutical container nested in the carrier with respect to the gravitational field. The weighing device can determine the weight of the pharmaceutical container by lifting it. This allows the pharmaceutical container to be weighed in a particularly simple and time-saving manner, in particular during additional processing steps of the pharmaceutical container, i.e. as an in-process control.

The invention also relates to a processing machine for processing the pharmaceutical containers which comprises a weighing device. The processing machine is designed to carry out the method according to the invention. The weighing apparatus is preferably designed to carry out the weighing of the at least one pharmaceutical container as an in-process control, i.e. during processing, for example during filling, of the pharmaceutical container.

BRIEF DESCRIPTION OF THE DRAWINGS

The invention is described below on the basis of embodiments in conjunction with the drawings. Components which have the same function are identified with the same reference signs in the drawings, in which.

DETAILED DESCRIPTION

Figure 1:
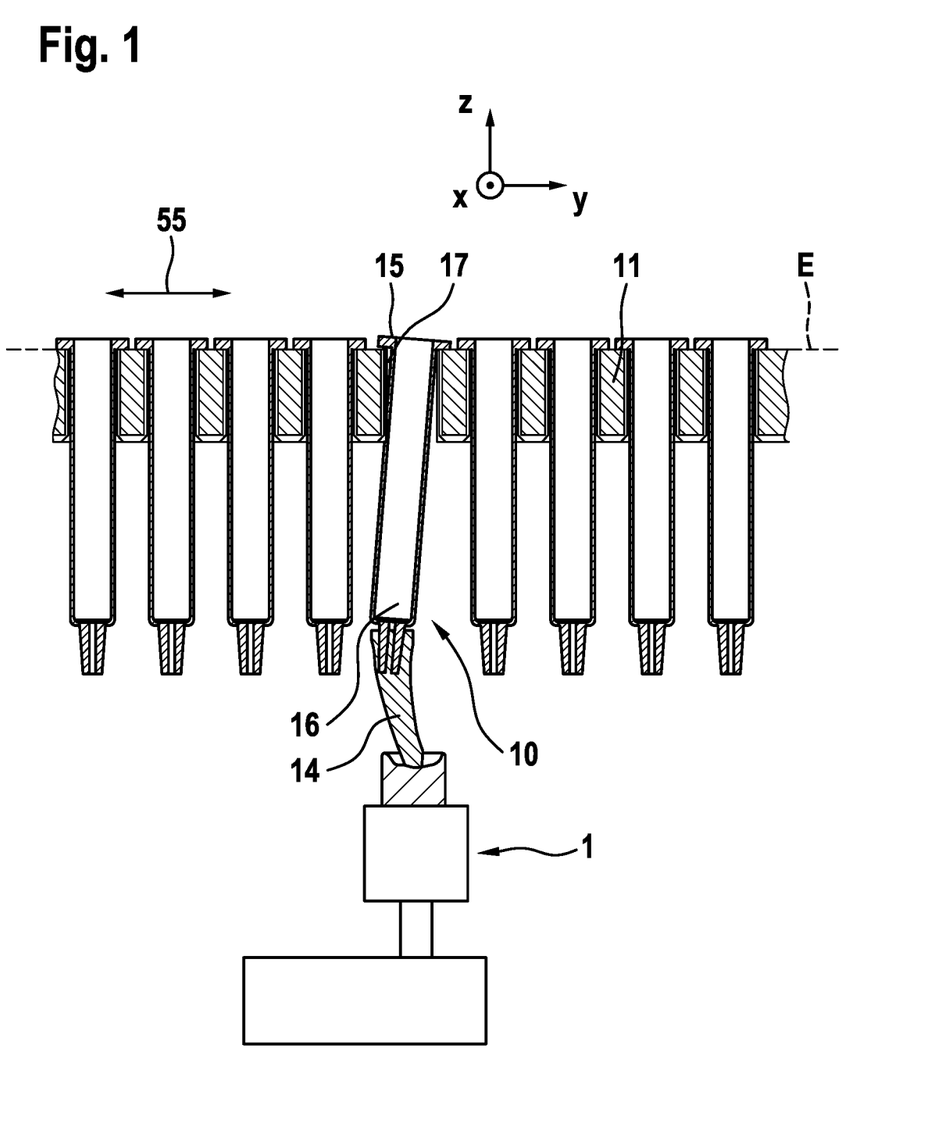
FIG. 1 is a detail of a simplified schematic sectional view of nested pharmaceutical containers, which are weighed using a method according to a first embodiment of the invention.

FIG. 1 shows a detail of a simplified schematic sectional view of a large number of pharmaceutical containers nested in a carrier 11, which containers are syringes 10 in the preferred embodiments. The syringes 10 are weighed using a method according to a first embodiment of the invention.

A weighing device 1, which is arranged below the syringes 10 in the vertical z direction, is provided for this purpose. The syringes 10 are weighed by being lifted vertically in the z direction by means of the weighing device 1.

As can be seen in FIG. 1, the syringes 10 are arranged hanging in the carrier 11. That is to say, a finger flange 15 of each syringe 10 is located on the carrier 11 and a cylindrical main body 16 of each syringe 10 extends through a through-opening 17 of the carrier 11. The cylindrical main body 16 of the syringe 10 has a smaller diameter than the corresponding through-opening 17.

Each syringe 10 also has a needle guard 14, with only one syringe 10 having a needle guard 14 being shown for reasons of clarity. The weighing device 1 begins weighing at the needle guard 14. In particular when a needle guard 14 is crooked, the syringe 10 may tilt in the carrier 11 when it is lifted, as shown in FIG. 1. This can lead to a distortion of the measurement results when weighing.

In order to prevent such tilting and in order to keep friction between the syringe 10 and the carrier 11 as low as possible, a relative movement is brought about between the syringes 10 and the carrier 11 in the method according to the invention in order to increase the weighing accuracy. For this purpose, the carrier 11 executes a movement in the form of two superimposed harmonic oscillations 55, 65 in the first embodiment. A first oscillation 55 of the carrier 11 takes place in the x direction and a second oscillation 65 takes place in the y direction. That is to say, the first oscillation 55 and the second oscillation 65 are located in a horizontal plane E in which the carrier 11 is located. The movement of the carrier 11 in the form of the superimposed oscillations 55, 65 is brought about by a servomotor 5 and a vibration motor 6, as shown in FIG. 2.

Figure 2:
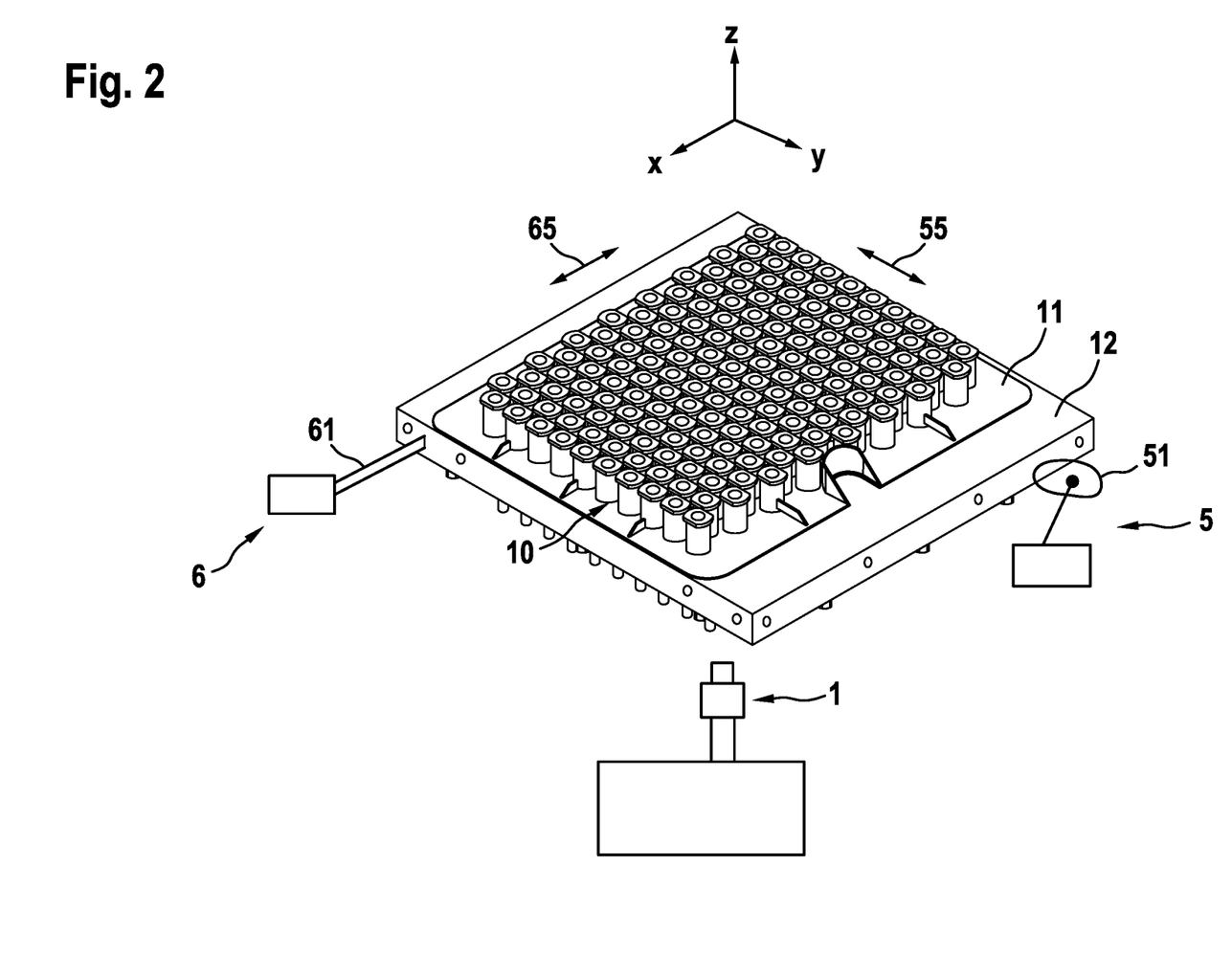
FIG. 2 is a perspective view of the nested pharmaceutical containers from FIG. 1.

FIG. 2 shows a perspective view of the nested syringes 10 and the weighing device 1 shown in FIG. 1. The carrier 11 is arranged in a base plate 12, the carrier 11 and the base plate 12 being immovably connected to one another. The servomotor 5 and the vibration motor 6, which bring about the movement of the base plate 12 and thus also of the carrier 11, are arranged outside the base plate 12. The servomotor 5 has an eccentric 51, by means of which it can set the base plate 12 in motion. By means of the servomotor 5, the base plate 12, and thus also the carrier 11, executes the movement in the form of the first oscillation 55 in the y direction. The vibration motor 6 has a rod 61, by means of which it can likewise set the base plate 12 in motion. By means of the vibration motor 6, the base plate 12, and thus also the carrier 11, executes the movement in the form of the second oscillation 65 in the x direction. The first oscillation 55 and the second oscillation 65 each have a frequency of between 10 Hz and 25 Hz.

Due to the inertia of the syringes 10 and the arrangement of the syringes 10 in the carrier 11 with play, the movement of the carrier 11 causes the syringes 10 to move relative to the carrier 11. As a result, the syringes 10 are released in the carrier 11. That is to say, the syringes 10 are arranged in the through-opening 17 of the carrier 11 so that they can move easily. In other words, the syringes 10 are thus shaken loose by the oscillations 55, 65 that are produced. This prevents the syringes 10 from tilting in the carrier 11, and friction between syringes 10 and carrier 11 is reduced. The syringes 10 can thus be lifted by means of the weighing device 1 without the influence of undesirable disruptive forces and it is possible to determine the weight of the syringes 10 very precisely.

Figure 3:
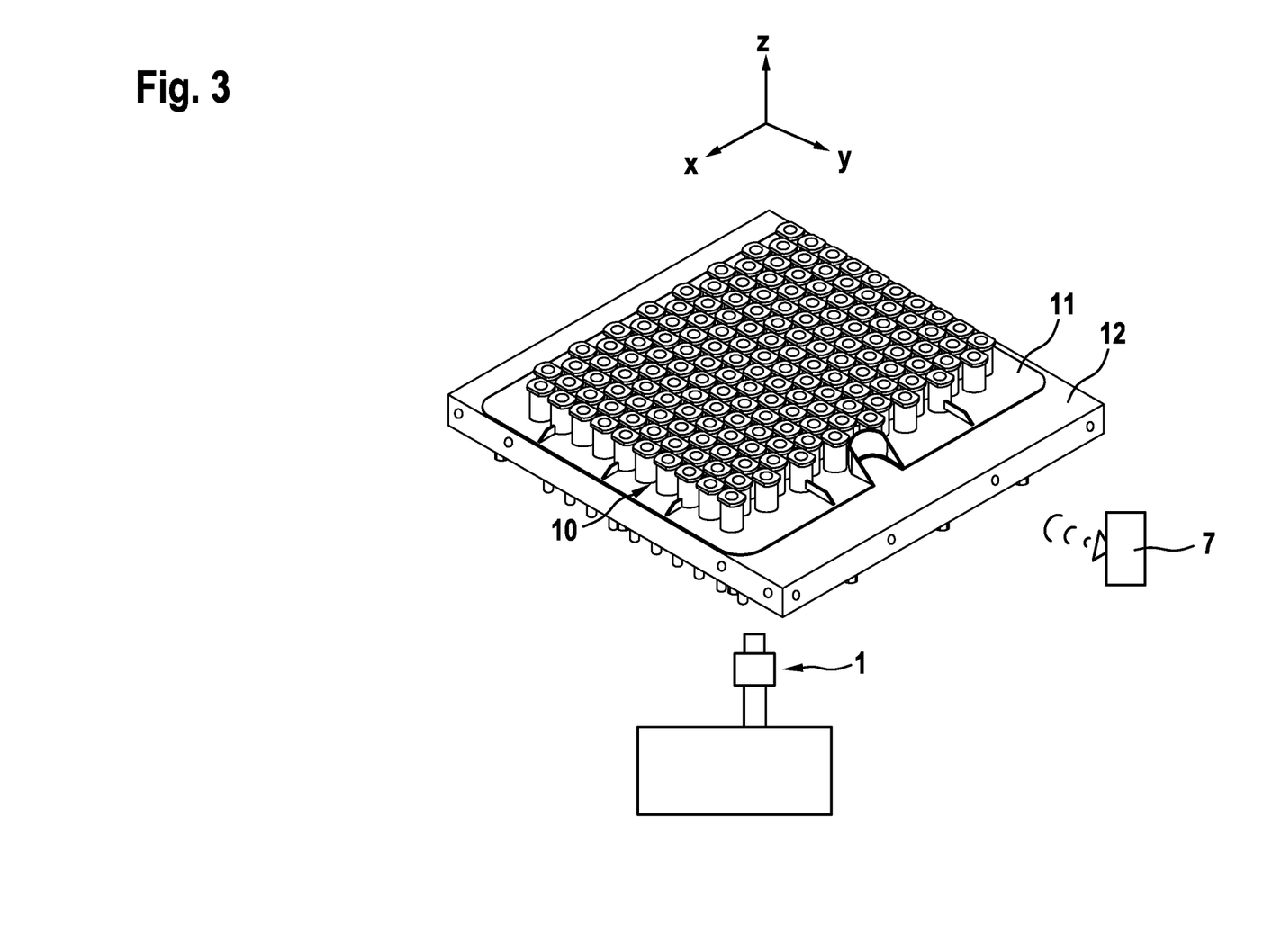
FIG. 3 is a perspective view of the nested pharmaceutical containers, which are weighed using a method according to a second embodiment of the invention.

FIG. 3 shows a perspective view of the nested syringes 10, which are weighed using a method according to a second embodiment of the invention. The second embodiment corresponds substantially to the first embodiment with an alternative option for introducing oscillations in order to release the syringes 10 from the carrier 11.

In the third embodiment, the syringes 10 are released from the carrier 11 by introducing the oscillation in the form of sound. The sound is generated by means of a loudspeaker apparatus 7. The sound is introduced into the arrangement of base plate 12, carrier 11 and syringe 10 substantially in the y direction. The sound is adapted in such a way that a movement of the syringes 10 relative to the carrier 11 is brought about due to resonance. This also makes it possible to release the syringes 10 from the carrier 11 in a particularly simple manner.

Figure 4:
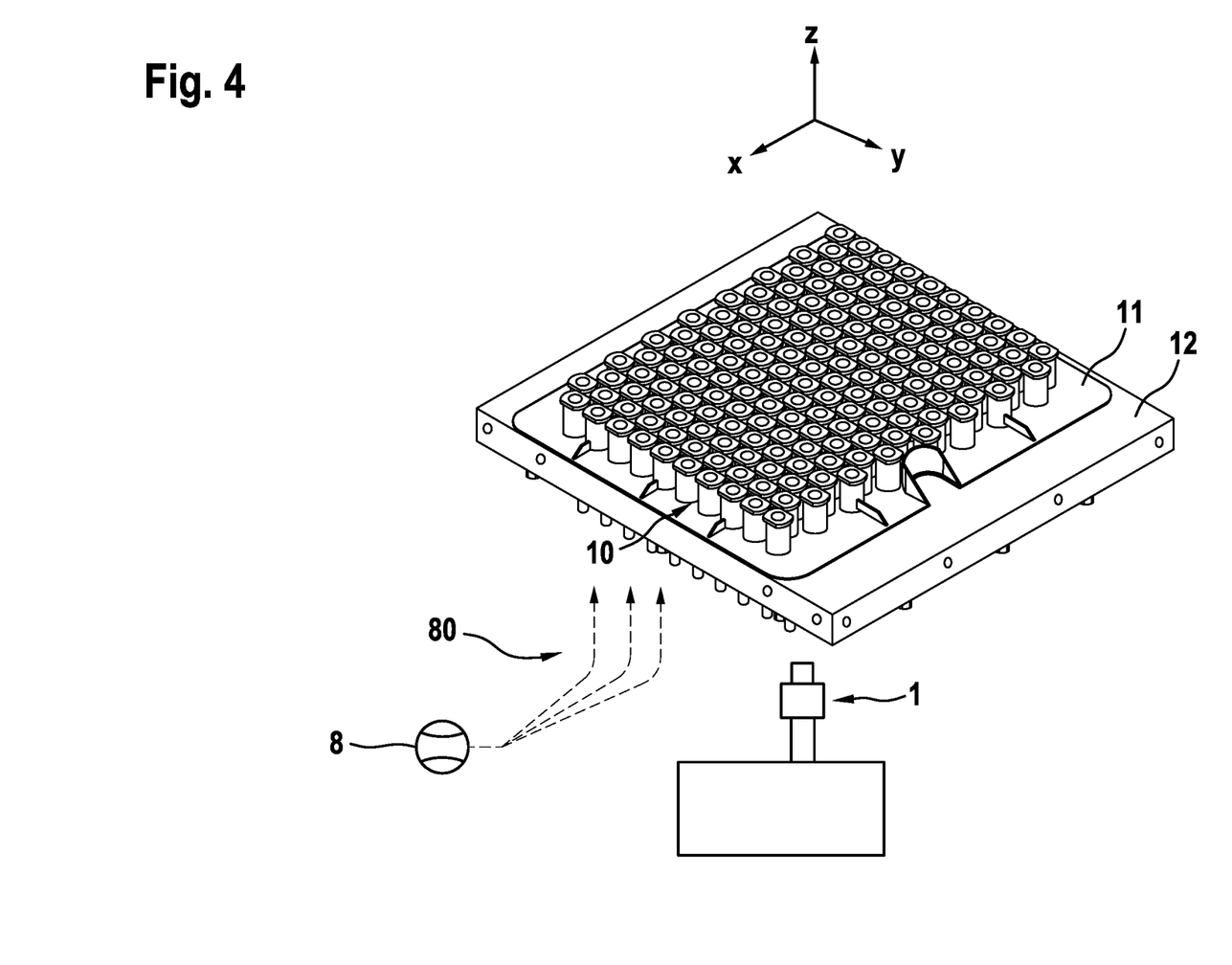
FIG. 4 is a perspective view of the nested pharmaceutical containers, which are weighed using a method according to a third embodiment of the invention.

FIG. 4 shows a perspective view of the nested syringes 10, which are weighed using a method according to a third embodiment of the invention. The third embodiment also corresponds substantially to the first embodiment with an alternative option for generating the relative movement between the syringes 10 and the carrier 11 in order to release the syringes 10 from the carrier 11. In the third embodiment in FIG. 4, the syringes 10 are released from the carrier 11 by a pulsating air flow 80, which strikes the syringes 10, being generated. The pulsating air flow 80 is generated by means of a fan apparatus 8 and is guided from below and in parallel with the z direction to the arrangement of base plate 12 and carrier 11 with the syringes 10. As a result of the pulsating air flow 80, the syringes 10 are briefly lifted relative to the carrier 11 several times, and thus released from the carrier 11.

Figure 5:
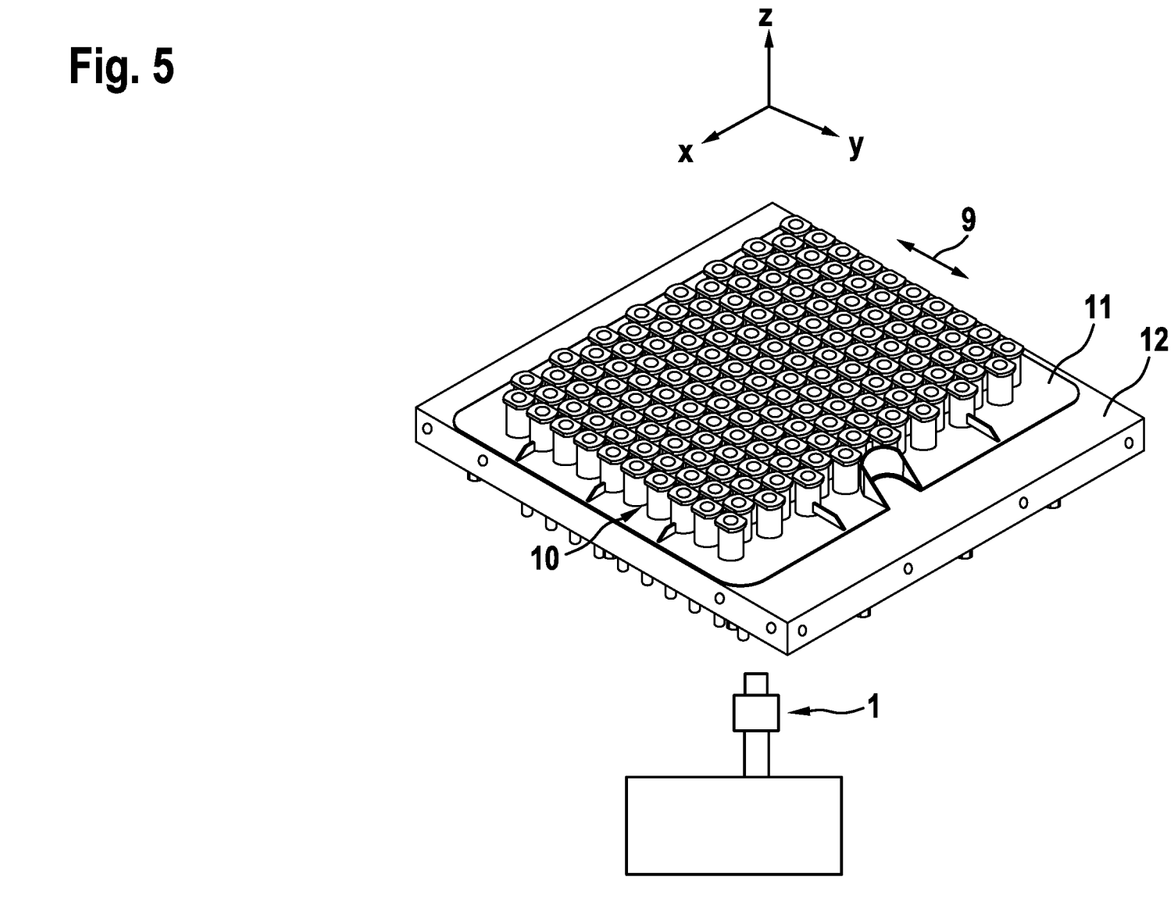
FIG. 5 is a perspective view of the nested pharmaceutical containers, which are weighed using a method according to a fourth embodiment of the invention.

FIG. 5 is a perspective view of the nested syringes 10, which are weighed using a method according to a fourth embodiment of the invention. The fourth embodiment also substantially corresponds to the first embodiment with a further alternative option for generating the relative movement between the syringes 10 and the carrier 11 in order to free the syringes 10 from the carrier 11. In the fourth embodiment in FIG. 5, the syringes 10 are released from the carrier 11 by electrostatic effects in the form of an alternating electrical field 9 bringing about the relative movement between the pharmaceutical container 10 and the carrier 11. The electric field 9 is generated by means of a capacitor (not shown).

Figure 6:
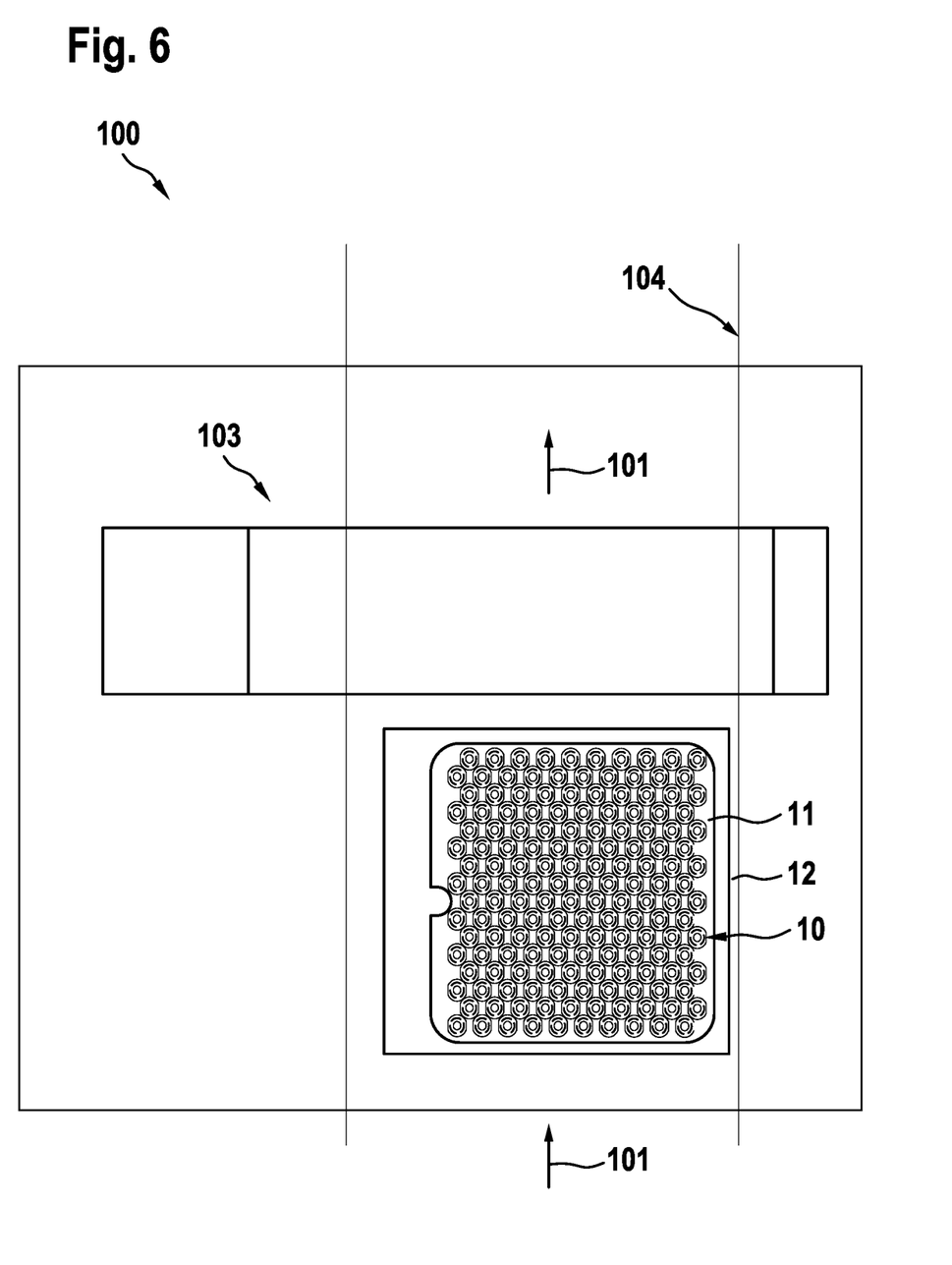
FIG. 6 is a simplified schematic view of a processing machine for processing the nested pharmaceutical containers from FIG. 1.

FIG. 6 shows a processing machine 100 for processing the nested syringes 10 from FIG. 1. The processing machine 100 is designed to carry out the method according to the first embodiment from FIGS. 1 and 2. The arrangement of base plate 12, carrier 11 and syringe 10 is transported through the processing machine 100 by means of a transport apparatus 104 in a transport direction 101.

The processing machine 100 further comprises a processing station 103 which comprises, inter alia, the weighing device 1, not shown in FIG. 6. The processing station 103 also comprises the servomotor 5 (not shown) and the vibration motor 6 in order to release the syringes 10 from the carrier 11. The processing station 103 further comprises a filling station for filling the syringes 10, a removal station for removing the syringes 10, which are not described in any more detail here.

It should be noted that any combination of the embodiments described is possible. Likewise, the oscillations, the sound, or the air flows can each be in any direction.

What is claimed is:

1. A method for weighing pharmaceutical containers (10) nested in a carrier (11),
   in which method at least one of the nested pharmaceutical containers (10) is weighed by a weighing device (1),
   wherein a relative movement is brought about between the at least one pharmaceutical container (10) and the carrier (11) so as to release the at least one pharmaceutical container (10) from the carrier (11) in order to increase the weighing accuracy,
   wherein the relative movement is brought about by an oscillation.

2. The method according to claim 1, wherein the relative movement is brought about by a harmonic oscillation.

3. The method according to claim 1, wherein the oscillation takes place in an x direction (x) and/or in a y direction (y) and/or in a z direction (z).

4. The method according to claim 1, wherein the carrier (11) and/or the weighing device (1) executes the oscillation in the form of a movement.

5. The method according to claim 4, wherein the movement of the carrier (11) and/or of the weighing device (1) is brought about by at least one servomotor (5) and/or by at least one vibration motor (6).

6. The method according to claim 1, wherein the oscillation is introduced in the form of sound.

7. A method for weighing pharmaceutical containers (10) nested in a carrier (11),
   in which method at least one of the nested pharmaceutical containers (10) is weighed by a weighing device (1),
   wherein a relative movement is brought about between the at least one pharmaceutical container (10) and the carrier (11) so as to release the at least one pharmaceutical container (10) from the carrier (11) in order to increase the weighing accuracy, wherein the relative movement is brought about by an air flow on the at least one pharmaceutical container (10).

8. A method for weighing pharmaceutical containers (10) nested in a carrier (11), in which method at least one of the nested pharmaceutical containers (10) is weighed by a weighing device (1), wherein a relative movement is brought about between the at least one pharmaceutical container (10) and the carrier (11) so as to release the at least one pharmaceutical container (10) from the carrier (11) in order to increase the weighing accuracy, wherein the relative movement is brought about by electrostatic effects (9) on the at least one pharmaceutical container (10).

9. The method according to claim 1, wherein the relative movement is brought about before weighing and/or during weighing.

10. The method according to claim 1, wherein the at least one pharmaceutical container (10) is weighed by being lifted by the weighing device (1).

11. A processing machine (100) for processing the pharmaceutical containers (10), the processing machine (100) comprising a weighing apparatus (1), wherein the processing machine (100) is designed to execute the method according to claim 1.

12. The method according to claim 5, wherein the at least one servomotor (5) comprises an eccentric (51).

13. The method according to claim 6, wherein the sound is introduced by at least one loudspeaker apparatus (7).

14. The method according to claim 7, wherein the air flow is a pulsating air flow (80).

15. The method according to claim 7, wherein the air flow is generated by at least one fan apparatus (8).

16. The method according to claim 7, wherein the relative movement is brought about before weighing and/or during weighing.

17. The method according to claim 7, wherein the at least one pharmaceutical container (10) is weighed by being lifted by the weighing device (1).

18. The method according to claim 8, wherein the relative movement is brought about before weighing and/or during weighing.

19. The method according to claim 8, wherein the at least one pharmaceutical container (10) is weighed by being lifted by the weighing device (1).

* * * * *